US012562799B2

(12) United States Patent
Caporal Del Barrio et al.

(10) Patent No.: US 12,562,799 B2
(45) Date of Patent: Feb. 24, 2026

(54) RADIO BEAM CONFIGURATION

(71) Applicant: NOKIA TECHNOLOGIES OY, Espoo (FI)

(72) Inventors: Samantha Caporal Del Barrio, Aalborg (DK); Benny Vejlgaard, Gistrup (DK); Christian Rom, Aalborg (DK); Frederick Vook, Schaumburg, IL (US); Simon Svendsen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 85 days.

(21) Appl. No.: 18/257,953

(22) PCT Filed: Dec. 14, 2021

(86) PCT No.: PCT/FI2021/050875
§ 371 (c)(1),
(2) Date: Jun. 16, 2023

(87) PCT Pub. No.: WO2022/129695
PCT Pub. Date: Jun. 23, 2022

(65) Prior Publication Data
US 2024/0048212 A1 Feb. 8, 2024

(30) Foreign Application Priority Data
Dec. 18, 2020 (FI) ...................................... 20206338

(51) Int. Cl.
*H04B 7/06* (2006.01)
*H04B 7/0456* (2017.01)
(52) U.S. Cl.
CPC ......... *H04B 7/0691* (2013.01); *H04B 7/0456* (2013.01)

(58) Field of Classification Search
CPC .. H04B 7/0691; H04B 7/0456; H04B 1/3838; H04B 7/0465; H01Q 1/245; H01Q 21/06;
(Continued)

(56) References Cited

U.S. PATENT DOCUMENTS 8,929,828 B2 1/2015 Hochwald
9,065,535 B2 * 6/2015 Wong ................... H04B 1/3827
(Continued)

FOREIGN PATENT DOCUMENTS

CN 110 445 517 A 11/2019
EP 3 745 608 A1 12/2020
(Continued)

OTHER PUBLICATIONS

"3rd Generation Partnership Project; Technical Specification Group Radio Access Network; NR; User Equipment (UE) radio transmission and reception; Part 2: Range 2 Standalone (Release 16)", 3GPP TS 38.101-2 v16.5.0, (Sep. 2020), 181 pages.
(Continued)

*Primary Examiner* — Sophia Vlahos
(74) *Attorney, Agent, or Firm* — ALSTON & BIRD LLP

(57) ABSTRACT

An apparatus, method and computer program product for: selecting (405), based on at least one first criterion, a set of antenna elements, determining (410) a radio beam codebook comprising a plurality of radio beam configurations for the set of antenna elements, determining (415) a radiation pattern obtainable based on the radio beam codebook, determining (420), based on the obtainable radiation pattern, a radio beam configuration that fulfills a second criterion, and applying (425) the radio beam configuration to a radio beam provided by the set of antenna elements.

16 Claims, 4 Drawing Sheets

400

405: SELECTING A SET OF ANTENNA ELEMENTS

410: DETERMINING A RADIO BEAM CODEBOOK

415: DETERMINING A RADIATION PATTERN

420: DETERMINING A RADIO BEAM CONFIGURATION

425: APPLYING THE RADIO BEAM CONFIGURATION

(58) Field of Classification Search
 CPC ..... H01Q 3/2605; G01S 13/426; G01S 13/02;
 G01S 7/006; G01S 2013/0245
 See application file for complete search history.

(56) References Cited

U.S. PATENT DOCUMENTS

| | | | |
|---|---|---|---|
| 9,300,342 | B2 | 3/2016 | Schlub et al. |
| 10,680,725 | B1 * | 6/2020 | Lu .......................... H04B 17/12 |
| 10,812,125 | B1 * | 10/2020 | Badic ................... H04W 72/542 |
| 11,190,252 | B2 * | 11/2021 | Laghate ............... H04B 7/0617 |
| 2013/0223245 | A1 * | 8/2013 | Taoka ............... H04L 25/03942 |
| | | | 370/252 |
| 2014/0153661 | A1 | 6/2014 | Hochwald |
| 2015/0372656 | A1 | 12/2015 | Mow et al. |
| 2016/0013849 | A1 * | 1/2016 | Kakishima ............. H04B 7/061 |
| | | | 375/267 |
| 2016/0198474 | A1 * | 7/2016 | Raghavan ............ H04B 7/0456 |
| | | | 370/335 |
| 2016/0315676 | A1 * | 10/2016 | Mammoser .......... H04B 7/0695 |
| 2017/0331533 | A1 | 11/2017 | Strong |
| 2018/0131434 | A1 | 5/2018 | Islam et al. |
| 2019/0150003 | A1 | 5/2019 | He et al. |
| 2019/0200365 | A1 | 6/2019 | Sampath et al. |
| 2019/0261289 | A1 | 8/2019 | Raghavan et al. |
| 2019/0393944 | A1 | 12/2019 | Huang et al. |
| 2020/0076064 | A1 | 3/2020 | Alon et al. |
| 2020/0112926 | A1 | 4/2020 | Laghate et al. |
| 2020/0186203 | A1 * | 6/2020 | Kim ....................... H04B 7/024 |
| 2020/0295854 | A1 * | 9/2020 | Narra ..................... H04B 17/21 |
| 2020/0328785 | A1 * | 10/2020 | Lee ...................... H04B 7/0482 |
| 2021/0067226 | A1 * | 3/2021 | Nilsson ................. H04W 52/34 |
| 2021/0218430 | A1 * | 7/2021 | Han ......................... H04B 1/18 |

FOREIGN PATENT DOCUMENTS

| | | | | |
|---|---|---|---|---|
| WO | WO-2017197237 | A1 * | 11/2017 | ............. H04B 7/063 |
| WO | WO 2019/091295 | A1 | 5/2019 | |
| WO | WO 2020/076841 | A1 | 4/2020 | |
| WO | WO 2020/101757 | A1 | 5/2020 | |
| WO | WO 2020/177860 | A1 | 9/2020 | |
| WO | WO 2020/228934 | A1 | 11/2020 | |
| WO | WO 2020/259852 | A1 | 12/2020 | |
| WO | WO 2021/008710 | A1 | 1/2021 | |
| WO | WO 2021/052716 | A1 | 3/2021 | |

OTHER PUBLICATIONS

Alekseev et al., "Millimeter wave power density in aquaeous biological samples," Bioelectromagnetics, vol. 22, No. 4, (2001), pp. 288-291.

Extended European Search Report for European Application No. 21905888.0 dated Mar. 27, 2024, 8 pages.

International Search Report and Written Opinion for Patent Cooperation Treaty Application No. PCT/FI2021/050875 dated Mar. 15, 2022, 14 pages.

Notice of Allowance for Finland Application No. 20206338 dated Apr. 4, 2022, 6 pages.

Office Action for Finland Application No. 20206338 dated Jun. 23, 2021, 9 pages.

Samsung, "New WID: Further enhancements on MIMO for NR", 3GPP TSG RAN Meeting #86, RP-193133, (Dec. 9-12, 2019), 5 pages.

Wu et al., "Safe for Generations to Come," IEEE Microwave Magazine, vol. 16, No. 2, (Mar. 2015), pp. 65-84.

Wu et al., "The Human Body and Millimeter-Wave Wireless Communication Systems: Interactions and Implications," IEEE International Conference on Communications (ICC), (Mar. 19, 2015), 7 pages.

Xu et al., "Power Density Measurements at 15 GHz for RF EMF Compliance Assessments of 5G User Equipment", IEEE Transactions on Antennas and Propagation, (Jun. 2017), 18 pages.

* cited by examiner

RADIO BEAM CONFIGURATION

CROSS-REFERENCE TO RELATED APPLICATIONS

This application is a national phase entry of International Application No. PCT/FI2021/050875, filed Dec. 14, 2021, which claims priority to Finnish Application No. 20206338, filed Dec. 18, 2020, the contents of which are hereby incorporated by reference in their entirety.

TECHNICAL FIELD

The present application relates generally to radio beam configuration. More specifically, the present application relates to applying the radio beam configuration to a radio beam provided by a set of antenna elements.

BACKGROUND

The amount of data increases constantly due to new ways of using user equipment such as streaming content. As a consequence, also users' expectations constantly rise in terms of speed of wireless connections, reliability and/or low power consumption of communication devices.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: selecting, based on at least one first criterion, a set of antenna elements, determining a radio beam codebook comprising a plurality of radio beam configurations for the set of antenna elements, determining a radiation pattern obtainable based on the radio beam codebook, determining, based on the obtainable radiation pattern, a radio beam configuration that fulfills a second criterion, and applying the radio beam configuration to a radio beam provided by the set of antenna elements.

According to a second aspect of the invention, there is provided a method comprising: selecting, based on at least one first criterion, a set of antenna elements, determining a radio beam codebook comprising a plurality of radio beam configurations for the set of antenna elements, determining a radiation pattern obtainable based on the radio beam codebook, determining, based on the obtainable radiation pattern, a radio beam configuration that fulfills a second criterion, and applying the radio beam configuration to a radio beam provided by the set of antenna elements.

According to a third aspect of the invention, there is provided a computer program comprising instructions for causing an apparatus to perform at least the following: selecting, based on at least one first criterion, a set of antenna elements, determining a radio beam codebook comprising a plurality of radio beam configurations for the set of antenna elements, determining a radiation pattern obtainable based on the radio beam codebook, determining, based on the obtainable radiation pattern, a radio beam configuration that fulfills a second criterion, and applying the radio beam configuration to a radio beam provided by the set of antenna elements.

According to a fourth aspect of the invention, there is provided an apparatus comprising at least one processor and at least one memory including computer program code, the at least one memory and the computer program code configured to with the at least one processor, cause the apparatus at least to: select, based on at least one first criterion, a set of antenna elements, determine a radio beam codebook comprising a plurality of radio beam configurations for the set of antenna elements, determine a radiation pattern obtainable based on the radio beam codebook, determine, based on the obtainable radiation pattern, a radio beam configuration that fulfills a second criterion, and apply the radio beam configuration to a radio beam provided by the set of antenna elements.

According to a fifth aspect of the invention, there is provided a non-transitory computer readable medium comprising program instructions for causing an apparatus to perform at least the following: selecting, based on at least one first criterion, a set of antenna elements, determining a radio beam codebook comprising a plurality of radio beam configurations for the set of antenna elements, determining a radiation pattern obtainable based on the radio beam codebook, determining, based on the obtainable radiation pattern, a radio beam configuration that fulfills a second criterion, and applying the radio beam configuration to a radio beam provided by the set of antenna elements.

According to a sixth aspect of the invention, there is provided a computer readable medium comprising program instructions for causing an apparatus to perform at least the following: selecting, based on at least one first criterion, a set of antenna elements, determining a radio beam codebook comprising a plurality of radio beam configurations for the set of antenna elements, determining a radiation pattern obtainable based on the radio beam codebook, determining, based on the obtainable radiation pattern, a radio beam configuration that fulfills a second criterion, and applying the radio beam configuration to a radio beam provided by the set of antenna elements.

According to a seventh aspect of the invention, there is provided a system comprising means for: selecting, based on at least one first criterion, a set of antenna elements, determining a radio beam codebook comprising a plurality of radio beam configurations for the set of antenna elements, determining a radiation pattern obtainable based on the radio beam codebook, determining, based on the obtainable radiation pattern, a radio beam configuration that fulfills a second criterion, and applying the radio beam configuration to a radio beam provided by the set of antenna elements.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to optimizing beamforming by a terminal device while taking into consideration maximum permissible exposure (MPE) limitations and uplink power restrictions. The maximum permissible exposure limitations and uplink power restrictions may be taken into consideration using a near-field and far-field proximity check. The near-field check may be performed on individual antenna elements and the far-field check may be performed on a combination of antenna elements.

According to an example embodiment, an apparatus is configured to select, based on at least one first criterion, a set of antenna elements, determine a radio beam codebook comprising a plurality of radio beam configurations for the set of antenna elements, determine a radiation pattern obtainable based on the radio beam codebook, determine, based on the obtainable radiation pattern, a radio beam configuration that fulfills a second criterion, and apply the radio beam configuration to a radio beam provided by the set of antenna elements.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
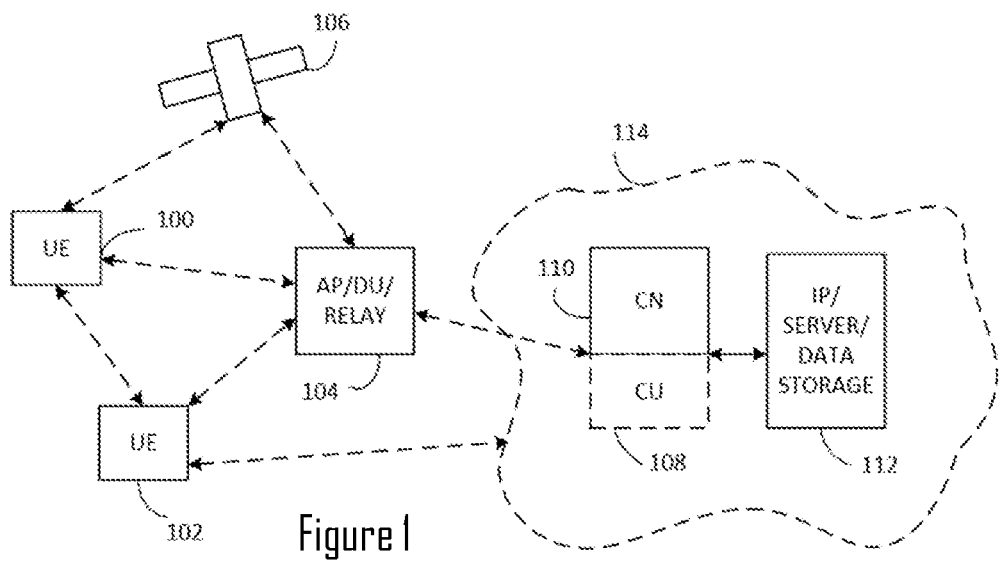
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The plurality of antennas or antenna elements may be co-located or distributed. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

The demand for bandwidth increases together with increasing online services and, hence, the 5G New Radio (NR) frequency spectrum extends above the previous 4G frequency spectrum. The 4G frequency spectrum comprises frequencies between 400 MHz and 6 GHz, while the 5G frequency spectrum comprises frequency between 24 GHz and 52 GHz, and possibly up to frequencies between 52 GHz and 114 GHz or above.

Operating at such high frequencies with high gain antennas raises concerns in terms of the health of users. In order to avoid health issues to skin due to thermal effects, different kinds of regulations are provided for the maximum power of user equipment. For example, the maximum permissible exposure (MPE) is determined for regulating power density (PD) of user equipment. As the energy absorbed by the human body increases as a function of distance to user equipment, the user equipment might have to reduce its power output to comply with the MPE limit if a user is in close proximity of an antenna of the user equipment. However, the reduction in the power output might be too high to maintain a communication link between the user equipment and a radio access network (RAN). On the other hand, an object in close proximity to the user equipment may cause reduction of the power output even if the object is not actually blocking the propagation path between the user equipment and the RAN.

Figure 2:
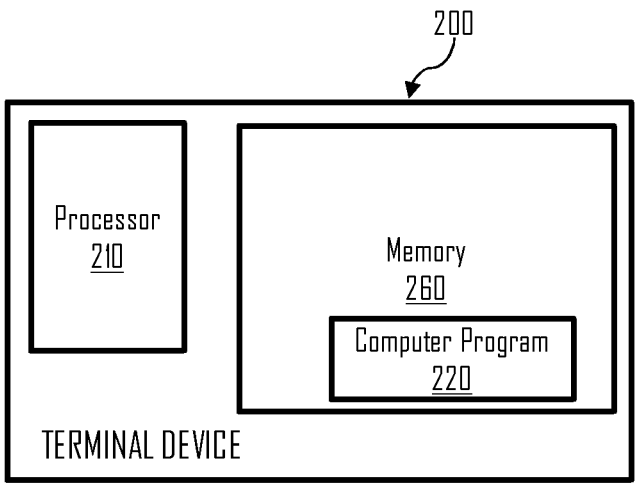
FIG. 2 shows a block diagram of an example device in which examples of the disclosed embodiments may be applied.

FIG. 2 is a block diagram depicting an apparatus 200 operating in accordance with an example embodiment of the invention. The apparatus 200 may be, for example, an electronic device such as a chip, chipset, an electronic module, a terminal device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Universal Serial Bus (USB) stick, a Compact Disc (CD), a Compact Disc Read-Only Memory (CD-ROM), a Digital Versatile Disk (DVD) or a Blu-ray disk.

According to an example embodiment, the apparatus 200 comprises a terminal device. A terminal device may comprise user equipment such as a smartphone, a tablet computer, or the like.

According to an example embodiment, the apparatus 200 comprises a plurality of antenna arrays. According to another example embodiment, the apparatus 200 is operatively connected to a plurality of antenna arrays. An antenna array may comprise different kinds of geometries. For example, an antenna array may comprise a linear array comprising antenna elements along a single axis, a circular antenna array, a spherical antenna array, or the like.

An antenna array may comprise a plurality of antenna elements. An antenna array may comprise, for example, 4-16 antenna elements such as 8 antenna elements. Assuming the apparatus 200 comprises, for example, a handheld device comprising a plurality of antenna arrays, the plurality of antenna arrays may be provided around the edges of the apparatus 200. For example, an antenna array may comprise a plurality of antenna patches that may be mounted on a substantially flat surface.

An antenna element may be associated with a radio frequency front-end (RFFE) comprising circuitry for receiving and/or transmitting radio signals via the antenna element. According to an example embodiment, the RFFE comprises a dedicated transmission path line-up for an antenna element. For example, if the RFFE receives/transmits radio signals via a first antenna element and a second antenna element, the RFFE comprises a dedicated transmission path line-up for the first antenna element and the second antenna element. The RFFE may further comprise parallel receiver paths for antenna elements.

According to an example embodiment, the apparatus 200 is configured to perform beamforming using a plurality of antenna elements that are spatially arranged and electrically interconnected. Performing beamforming may comprise controlling a plurality of antenna elements for forming a particular radio beam.

Beamforming is a spatial filtering technique that comprises directional signal transmission or reception. Directional transmission comprises directing radio energy through a radio channel towards a specific receiver. Directing radio energy may be performed by adjusting the phase and/or amplitude of transmitted signals such that the produced signal corresponds to a desired pattern. Directional reception comprises collecting signal energy from a specific transmitter. Collecting signal energy from a specific transmitter may be performed by changing a received signal in phase and amplitude such that the collected signal corresponds to a desired pattern.

The apparatus 200 may be configured to form a radio beam based on a plurality of parameters defining a particular radio beam configuration for forming a particular radio beam. For example, a radio beam configuration may comprise parameters for defining a particular radio beam gain, radio beam width, a direction of the radio beam, or the like.

According to an example embodiment, the apparatus 200 is configured to select, based on at least one first criterion, a set of antenna elements. Selecting the set of antenna elements may comprise determining a plurality of antenna elements that fulfill the at least one first criterion.

The at least one criterion may comprise a criterion indicating a status of the antenna element. For example, the at least one criterion may relate to determining whether the antenna element may be selected to the set of antenna elements.

According to an example embodiment, the at least one first criterion comprises an impedance level of an antenna element being below a threshold value. An impedance level of an antenna element being below a threshold value may indicate that the antenna element is substantially free from blockage while an impedance level being above a threshold value may indicate that the antenna element is at least partially blocked by an object.

Without limiting the scope of the claims, an advantage of selecting a set of antenna elements based on at least one criterion is that individual antenna elements fulfilling at least one criterion may be utilized in terms of enabling flexible beam steering. Another advantage is that antenna elements that fail to fulfill the at least one criterion may be excluded from the set of antenna elements.

The set of antenna elements may comprise one or more antenna elements from a plurality of antenna arrays. According to an example embodiment, the set of antenna elements comprises at least one antenna element from a first antenna array and at least one antenna element from a second antenna array. For example, the set of antenna elements may comprise four antenna elements from a first antenna array and four antenna elements from a second antenna array. As another example embodiment, the set of antenna elements may comprise two antenna elements from a first antenna array and six antenna elements from a second antenna array.

Without limiting the scope of the claims, an advantage of the set of antenna elements comprising antenna elements from a plurality of antenna arrays is that more versatile shapes of radiation patterns may be provided than with a linear antenna array.

The set of antenna elements may be used for providing a desired radio beam. Providing a desired radio beam may comprise beamforming and/or beam steering. The apparatus 200 may be configured to determine a radio beam codebook based on the set of antenna elements.

According to an example embodiment, the apparatus 200 is configured to determine a radio beam codebook comprising a plurality of radio beam configurations for the set of antenna elements. The radio beam codebook may comprise a plurality of radio beam codebook entries. A radio beam codebook entry may comprise a radio beam configuration for forming a particular radio beam.

According to an example embodiment, determining a radio beam codebook comprises selecting a radio beam codebook or calculating a radio beam codebook. The apparatus 200 may be configured to select or calculate a radio beam codebook based on the number of antenna elements included in the set of antenna elements. For example, the apparatus 200 may be configured to select an existing radio beam codebook based on the number of antenna elements included in the set of antenna elements or dynamically calculate a radio beam codebook based on the number of antenna elements included in the set of antenna elements.

According to an example embodiment, the apparatus 200 is configured to determine the radio beam codebook based on a radio beam gain and direction for maintaining a communication link with a radio access network. For example, the apparatus 200 may be configured to determine the radio beam codebook based on a desired link budget.

Without limiting the scope of the claims, an advantage of determining a radio beam codebook comprising a plurality of radio beam configurations for the set of antenna elements is that a combination of antenna elements may be used for providing a desired radio beam, thereby enabling an increased freedom of steering of a radio beam.

According to an example embodiment, the apparatus 200 is configured to perform beam steering. Beam steering may be achieved by changing a phase of an input signal on radiating antenna elements. Phase shifting allows the signal to be targeted to a specific direction. An antenna may employ radiating elements with a common frequency to steer a single beam in a specific direction. In order to perform beam steering, calibration of the antenna elements in the set of antenna elements may be needed.

According to an example embodiment, the apparatus 200 is configured to calibrate phase coherence between antenna elements included in the set of antenna elements. Calibrating phase coherence may comprise, for example, synchronizing a phase and timing between radio frequency signals associated with antenna elements.

According to an example embodiment, the apparatus 200 is configured to determine a radiation pattern obtainable based on the radio beam codebook. An obtainable radiation pattern may depend upon a number of antenna elements in the set of antenna elements and/or characteristics of the antenna elements included in the set of antenna elements. According to an example embodiment, a radiation pattern comprises a directional dependence of a strength of radio waves from an antenna. A directional dependence of a strength of radio waves from an antenna may comprise, for example, an angular dependence of a strength of radio waves from the antenna.

A radiation pattern may be determined using radar technology. The apparatus 200 may be configured to receive, using a radar view, information on a distance to any obstacles and/or users in a particular direction. According to an example embodiment, determining a radiation pattern obtainable based on the radio beam codebook comprises determining, using a radar view, the radiation pattern in a plurality of directions.

Without limiting the scope of the claims, an advantage of determining a radiation pattern obtainable based on the radio beam codebook is that the apparatus receives information on any obstacles and/or users in a particular direction.

The apparatus 200 may be configured to use the obtainable radiation pattern for determining a radio beam that avoids any detected obstacles and/or users in order to avoid triggering an MPE event and thereby a power restriction.

According to an example embodiment, the apparatus 200 is configured to determine, based on the obtainable radiation pattern, a radio beam configuration that fulfills a second criterion. According to an example embodiment, the second criterion comprises a maximum permissible exposure being below a threshold value.

A radio beam configuration may correspond to an entry in a radio beam codebook. A radio beam codebook comprises a set of analogue phase shift values and/or magnitude values to be applied to antenna elements in order to form an analogue radio beam. In practice, a radio beam codebook may comprise a matrix where a column specifies a beam-forming weight vector and a pattern of direction.

According to an example embodiment, the radio beam configuration comprises a plurality of parameters for forming a radio beam using a plurality of antenna elements included in the set of antenna elements.

Determining a radio beam configuration that fulfills a second criterion may comprise determining a plurality of radio beam configurations and determining which of the plurality of radio beam configurations fulfills the second criterion.

The apparatus 200 may be configured to modify the set of antenna elements in response to determining that a radio beam configuration fails to fulfill the second criterion. According to an example embodiment, the apparatus 200 is configured to remove at least one codebook entry from the determined radio beam codebook in response to determining that the radio beam configuration fails to fulfill the second criterion.

Without limiting the scope of the claims, an advantage of determining a radio beam configuration that fulfills a second criterion based on an obtainable radiation pattern is that a radio beam avoiding any blockages may be provided thereby enabling dynamic steering of radio beams while maintaining a communication link.

According to an example embodiment, the apparatus 200 is configured to apply the radio beam configuration to a radio beam provided by the set of antenna elements. Applying the radio beam configuration to a radio beam provided by the set of antenna elements may comprise beam steering. Beam steering may comprise redirecting a radio beam from a first direction to a second direction.

According to an example embodiment, the apparatus 200 is configured to apply the radio beam configuration to a transmitting radio beam provided by the antenna elements. The apparatus 200 may be configured to apply the radio beam configuration to a transmitting radio beam without modifying a receiving radio beam.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for select-ing, based on at least one first criterion, a set of antenna elements, means for determining a radio beam codebook comprising a plurality of radio beam configurations for the set of antenna elements, means for determining a radiation pattern obtainable based on the radio beam codebook, means for determining, based on the obtainable radiation pattern, a radio beam configuration that fulfills a second criterion, and means for applying the radio beam configuration to a radio beam provided by the set of antenna elements.

The apparatus 200 may further comprise means for deter-mining the radio beam codebook based on a radio beam gain and direction for maintaining a communication link with a radio access network, means for removing at least one codebook entry from the determined radio beam codebook in response to determining that the radio beam configuration fails to fulfill the second criterion and/or means for calibrat-ing phase coherence between antenna elements included in the set of antenna elements.

Figures 3, 4:
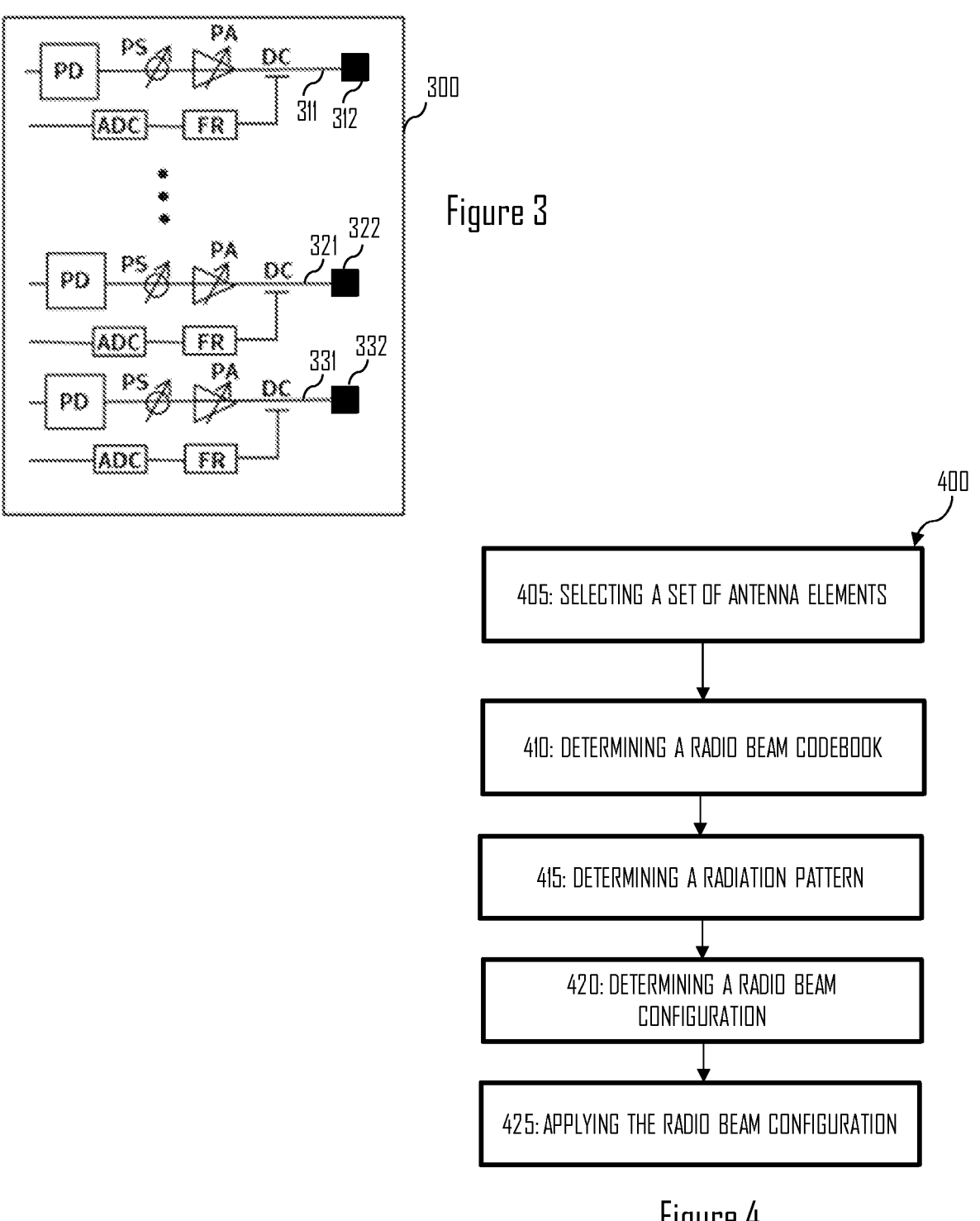
FIG. 3 illustrates an example front-end module according to an example embodiment of the invention.
FIG. 4 illustrates an example method according to an example embodiment of the invention.

FIG. 3 illustrates an example radio frequency front-end (RFFE) module 300 comprising dedicated transmission paths for antenna elements. The RFFE may further comprise parallel receiver paths for antenna elements. The apparatus 200 may comprise the RFFE module 300 or the apparatus 200 may be operatively connected to the RFFE module 300.

In the example of FIG. 3, an antenna element 312, 322, 332 is associated with a dedicated transmission path 311, 321, 331, respectively. A dedicated transmission path 311, 321, 331 comprises at least one phase shifter. A phase shifter is configured to enable shaping and/or steering transmission and/or reception of beams towards a desired direction. A phase shifter may be associated with an antenna element via a power amplifier (PA).

An antenna element 312, 322, 332 may be included in a set of antenna arrays based on load measure in the power detector (PD) or the feedback receiver (FR). For example, an antenna element 312, 322, 332 may be included in the set of antenna elements in response to an impedance of the antenna element 312, 322, 332 being below a predetermined thresh-old value. An analogue-to-digital converter (ADC) is con-figured to convert an analogue signal into a digital signal.

FIG. 4 illustrates an example method 400 incorporating aspects of the previously disclosed embodiments. More specifically the example method 400 illustrates applying a radio beam configuration. The method may be performed, for example, by the apparatus 200.

The method starts with selecting 405, based on at least one first criterion, a set of antenna elements. Selecting the set of antenna elements may comprise determining a plurality of antenna elements that fulfill the at least one first criterion. In the example of FIG. 4, the at least one first criterion comprises an impedance level of an antenna element being below a threshold value.

The set of antenna elements may comprise at least one antenna element from a first antenna array and at least one antenna element from a second antenna array.

The method continues with determining 410 a radio beam codebook comprising a plurality of radio beam configura-tions for the set of antenna elements. The radio beam codebook may be determined based on a radio beam gain and direction for maintaining a communication link with a radio access network.

Determining a radio beam codebook may comprise, for example, selecting a radio beam codebook or calculating a radio beam codebook.

The method further continues with determining 415 a radiation pattern obtainable based on the radio beam code-book. A radiation pattern may comprise a directional depen-dence of a strength of radio waves from an antenna such as an angular dependence of a strength of radio waves from the antenna.

The method further continues with determining 420, based on the obtainable radiation pattern, a radio beam configuration that fulfills a second criterion. In the example of FIG. 4, the second criterion comprises a maximum permissible exposure being below a threshold value.

The radio beam configuration may comprise a plurality of parameters for forming a radio beam using a plurality of antenna elements included in the set of antenna elements.

The method further continues with applying 425 the radio beam configuration to a radio beam provided by the set of antenna elements. Applying the radio beam configuration to a radio beam provided by the set of antenna elements may comprise beam steering. Beam steering may comprise, for example, redirecting a radio beam from a first direction to a second direction.

Figure 5:
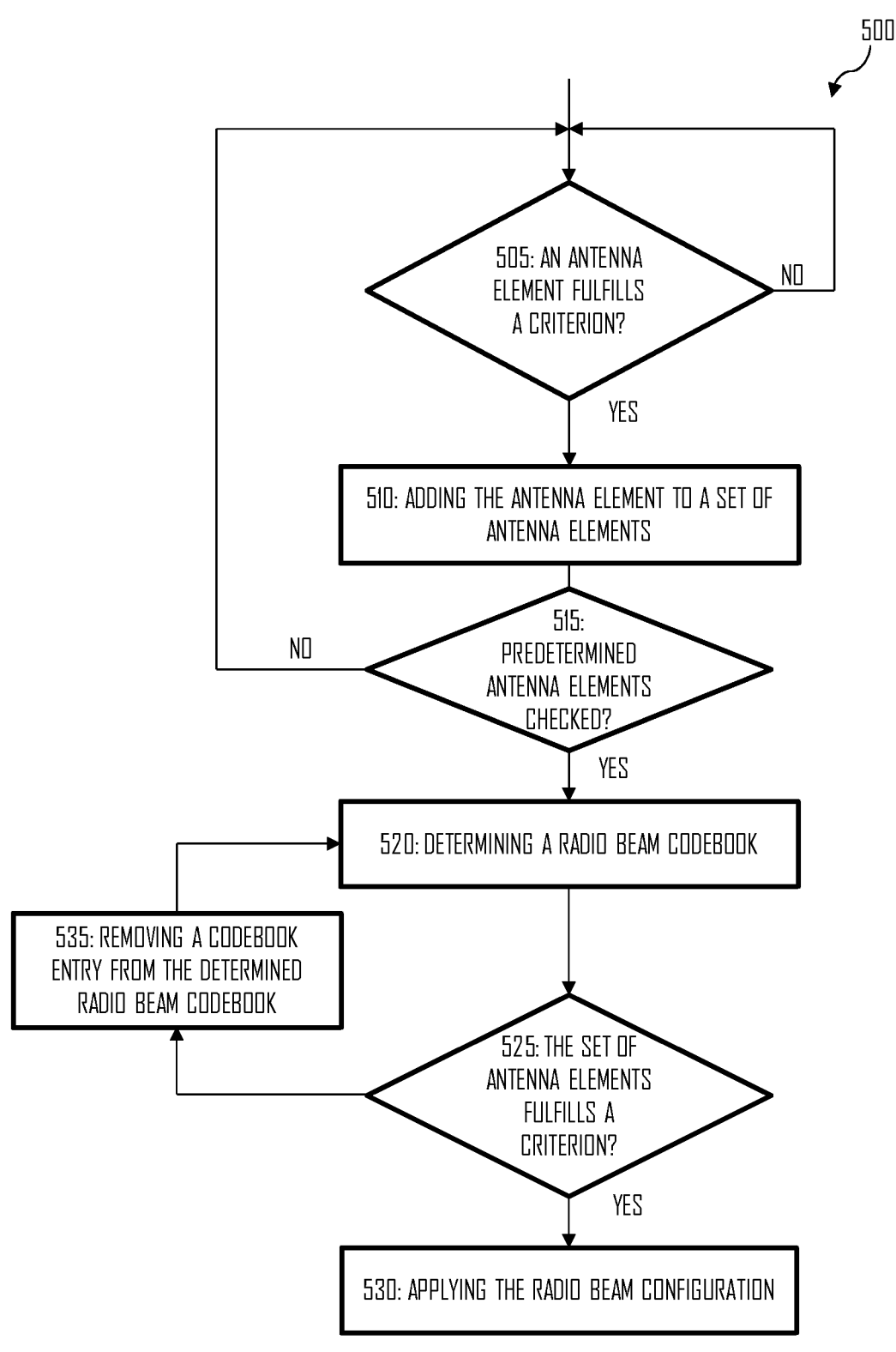
FIG. 5 illustrates another example method according to an example embodiment of the invention.

FIG. 5 illustrates another example method 500 incorporating aspects of the previously disclosed embodiments. More specifically the example method 500 illustrates applying a radio beam configuration. The method may be performed, for example, by the apparatus 200.

The method starts with selecting, based on at least one first criterion, a set of antenna elements. Selecting the set of antenna elements may comprise determining a plurality of antenna elements that fulfill the at least one first criterion.

In the example of FIG. 5, selecting a set of antenna elements comprises determining 505 whether an antenna element fulfills the at least one first criterion. The at least one first criterion comprises an impedance level of an antenna element being below a threshold value.

If the antenna element fails to fulfill the at least one criterion, a next antenna element is checked. If the antenna element fulfills the at least one criterion, the method continues with adding 510 the antenna element to a set of antenna elements and determining 515 whether the predetermined number of antenna elements are checked. If the predetermined number of antenna elements are not checked, the method returns to determining whether a next antenna element fulfills the at least one criterion.

The method continues with determining 520 a radio beam codebook comprising a plurality of radio beam configurations for the set of antenna elements. Determining a radio beam codebook may comprise, for example, selecting a radio beam codebook or calculating a radio beam codebook.

The radio beam codebook may be determined based on a radio beam gain and direction for maintaining a communication link with a radio access network.

The method further continues with determining 525 whether the set of antenna elements fulfill a second criterion. If the set of antenna elements fail to fulfill the second criterion, the method continues with removing 535 a codebook entry from the determined radio beam codebook. If the set of antenna elements fulfill the second criterion, the method continues with applying 530 the radio beam configuration to a radio beam provided by the set of antenna elements.

Figure 6:
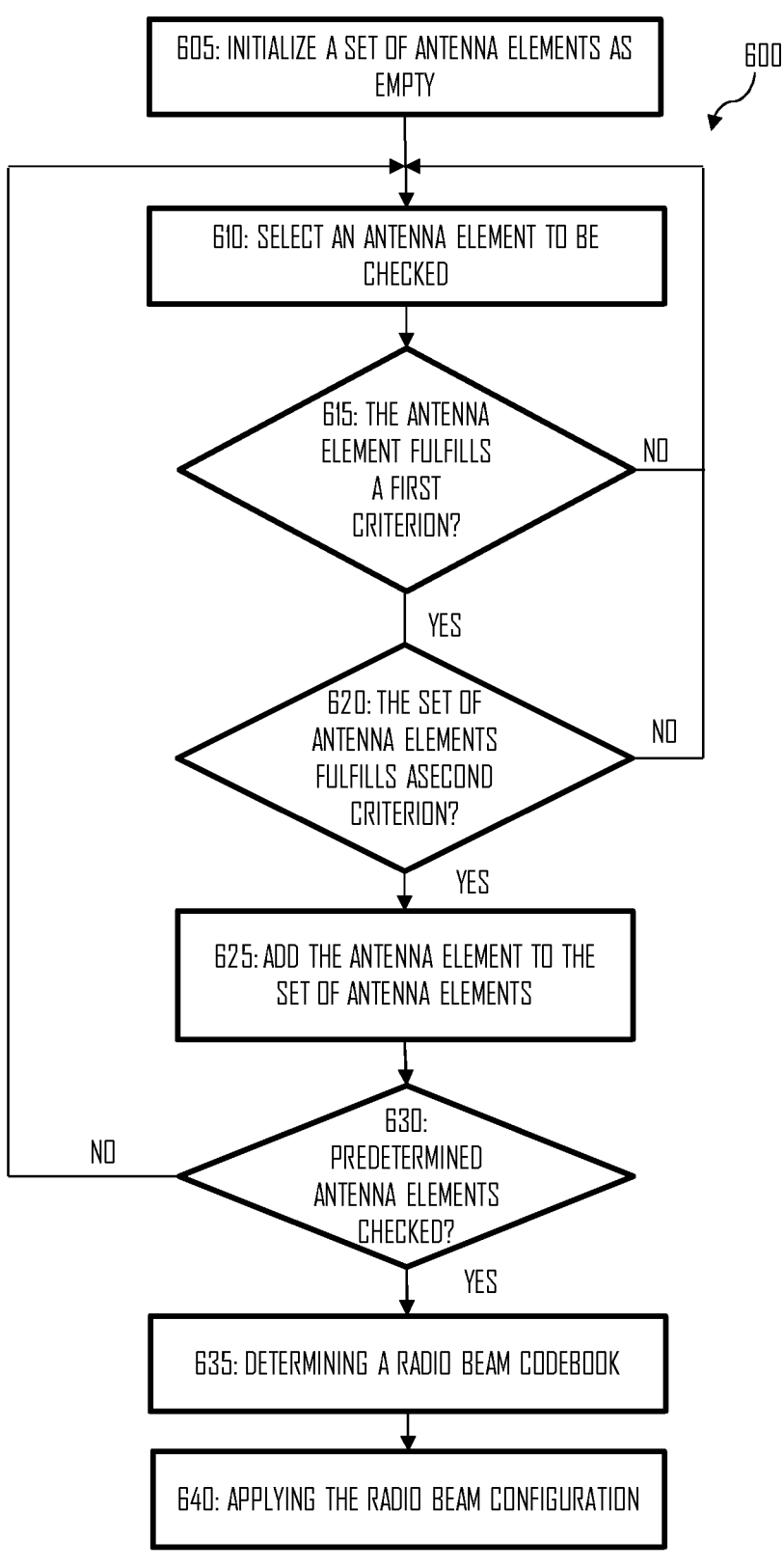
FIG. 6 illustrates a further example method according to an example embodiment of the invention.

FIG. 6 illustrates a further example method 600 incorporating aspects of the previously disclosed embodiments. More specifically the example method 600 illustrates applying a radio beam configuration. The method may be performed, for example, by the apparatus 200.

The method starts with initializing 605 a set of antenna elements as empty and selecting 610 an antenna element to be checked.

The method continues with determining 615 whether an antenna element fulfills the at least one first criterion. The at least one first criterion comprises an impedance level of an antenna element being below a threshold value.

If the antenna element fails to fulfill the at least one criterion, a next antenna element is selected for checking. If the antenna element fulfills the at least one criterion, the method continues with determining 620 whether the set of antenna elements fulfills a second criterion.

If the set of antenna elements fails to fulfill the second criterion, a next antenna element is selected for checking. If the antenna element fulfills the second criterion, the method continues with adding 625 the antenna element to the set of antenna elements.

The method further continues with determining 630 whether the predetermined antenna elements are checked. If the predetermined antenna elements are not checked, a next antenna element is selected for checking. If the predetermined antenna elements are checked, the method continues with determining 635 a radio beam codebook comprising a plurality of radio beam configurations for the set of antenna elements.

Determining a radio beam codebook may comprise, for example, selecting a radio beam codebook or calculating a radio beam codebook. The radio beam codebook may be determined based on a radio beam gain and direction for maintaining a communication link with a radio access network.

The method further continues with applying 640 the radio beam configuration to a radio beam provided by the set of antenna elements.

Without limiting the scope of the claims, an advantage of determining a radio beam configuration that fulfills an MPE criterion is that an MPE compliant radio beam may be provided by combining antenna elements. Another advantage is that no dedicated sensors are needed for checking whether the MPE criterion is fulfilled.

Without limiting the scope of the claims, a further advantage is that the invention makes the system MPE compliant and the invention maximizes transmit power by combining antenna patches. The transmit power could increase e.g. 3 dB or more.

Without in any way limiting the scope, interpretation, or application of the claims appearing below, a technical effect of one or more of the example embodiments disclosed herein is that a radio beam codebook may be determined while taking blockages into account thereby enabling avoiding MPE events.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory storing instructions that, when executed by the at least one processor, cause the apparatus at least to:
    select, based on at least one first criterion, a set of antenna elements;
    select a radio beam codebook based on a radio beam gain and direction for maintaining a communication link with a radio access network, wherein the radio beam codebook comprises a plurality of radio beam configurations for the set of antenna elements;
    determine a radiation pattern obtainable based on the radio beam codebook;
    determine, based on the obtainable radiation pattern, a radio beam configuration that fulfills a second criterion; and
    apply the radio beam configuration to a radio beam provided by the set of antenna elements.

2. The apparatus according to claim 1, wherein the set of antenna elements comprises at least one antenna element from a first antenna array and at least one antenna element from a second antenna array.

3. The apparatus according to claim 1, wherein the at least one first criterion comprises an impedance level of an antenna element being below a threshold value.

4. The apparatus according to claim 1, wherein the second criterion comprises a maximum permissible exposure being below a threshold value.

5. The apparatus according to claim 1, wherein the at least one memory storing instructions that, when executed by the at least one processor, cause the apparatus to remove at least one codebook entry from the selected radio beam codebook in response to determining that the radio beam configuration fails to fulfill the second criterion.

6. The apparatus according to claim 1, wherein the radio beam configuration comprises a plurality of parameters for forming a radio beam using a plurality of antenna elements included in the set of antenna elements.

7. The apparatus according to claim 1, wherein the at least one memory storing instructions that, when executed by the at least one processor, cause the apparatus to calibrate phase coherence between antenna elements included in the set of antenna elements.

8. The apparatus according to claim 1, wherein the apparatus comprises a terminal device.

9. A method comprising:
    selecting, based on at least one first criterion, a set of antenna elements;
    selecting a radio beam codebook based on a radio beam gain and direction for maintaining a communication link with a radio access network, wherein the radio beam codebook comprises a plurality of radio beam configurations for the set of antenna elements;
    determining a radiation pattern obtainable based on the radio beam codebook;
    determining, based on the obtainable radiation pattern, a radio beam configuration that fulfills a second criterion; and
    applying the radio beam configuration to a radio beam provided by the set of antenna elements.

10. A non-transitory computer readable medium comprising program instructions that, when executed by an apparatus, cause the apparatus to perform at least the following:
    selecting, based on at least one first criterion, a set of antenna elements;
    selecting a radio beam codebook based on a radio beam gain and direction for maintaining a communication link with a radio access network, wherein the radio beam codebook comprises a plurality of radio beam configurations for the set of antenna elements;
    determining a radiation pattern obtainable based on the radio beam codebook;
    determining, based on the obtainable radiation pattern, a radio beam configuration that fulfills a second criterion; and
    applying the radio beam configuration to a radio beam provided by the set of antenna elements.

11. The method according to claim 9, wherein the set of antenna elements comprises at least one antenna element from a first antenna array and at least one antenna element from a second antenna array.

12. The method according to claim 9, wherein the at least one first criterion comprises an impedance level of an antenna element being below a threshold value.

13. The method according to claim 9, wherein the second criterion comprises a maximum permissible exposure being below a threshold value.

14. The method according to claim 9, wherein the method comprises removing at least one codebook entry from the selected radio beam codebook in response to determining that the radio beam configuration fails to fulfill the second criterion.

15. The method according to claim 9, wherein the radio beam configuration comprises a plurality of parameters for forming a radio beam using a plurality of antenna elements included in the set of antenna elements.

16. The method according to claim 9, wherein the method comprises calibrating phase coherence between antenna elements included in the set of antenna elements.

\* \* \* \* \*